(12) United States Patent
Santhar et al.

(10) Patent No.: US 12,445,662 B2
(45) Date of Patent: Oct. 14, 2025

(54) NEXT EVENT AND FRAME PREDICTION SYSTEM FOR LIVE VIDEO

(71) Applicant: International Business Machines Corporation, Armonk, NY (US)

(72) Inventors: Sathya Santhar, Ramapuram (IN); Sridevi Kannan, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/449,136

(22) Filed: Aug. 14, 2023

(65) Prior Publication Data

US 2025/0063215 A1 Feb. 20, 2025

(51) Int. Cl.
*H04N 21/234* (2011.01)
*H04N 21/2187* (2011.01)
*H04N 21/25* (2011.01)
*H04N 21/81* (2011.01)

(52) U.S. Cl.
CPC ... *H04N 21/23418* (2013.01); *H04N 21/2187* (2013.01); *H04N 21/23424* (2013.01); *H04N 21/251* (2013.01); *H04N 21/812* (2013.01)

(58) Field of Classification Search
CPC ....... H04N 21/23418; H04N 21/23424; H04N 21/2187; H04N 21/251; H04N 21/812
See application file for complete search history.

(56) References Cited

U.S. PATENT DOCUMENTS

| | | |
|---|---|---|
| 10,929,752 B2 | 2/2021 | Katz et al. |
| 11,556,963 B2 | 1/2023 | Katz et al. |
| 2004/0193529 A1 | 9/2004 | Asher et al. |
| 2013/0124298 A1 | 5/2013 | Li et al. |
| 2013/0311303 A1* | 11/2013 | Huang ............... G06Q 30/0251 705/14.71 |
| 2015/0025949 A1* | 1/2015 | Zalewski ........... H04N 21/8586 705/14.4 |
| 2016/0050465 A1* | 2/2016 | Zaheer ............... H04N 21/6125 725/34 |
| 2017/0213086 A1* | 7/2017 | Cao ........................ G11B 27/28 |
| 2018/0053294 A1* | 2/2018 | Rastgar ................ G06V 10/507 |
| 2018/0082152 A1* | 3/2018 | Katz .................... G06F 16/7837 |
| 2018/0330408 A1 | 11/2018 | Bennett |
| 2019/0303981 A1* | 10/2019 | Teller .................. G06Q 30/0276 |
| 2020/0186875 A1* | 6/2020 | Han .................... H04N 21/4316 |
| 2021/0383579 A1* | 12/2021 | Lam ..................... G06V 10/764 |
| 2022/0360864 A1* | 11/2022 | Hall .................... H04N 21/2187 |

FOREIGN PATENT DOCUMENTS

| | | | |
|---|---|---|---|
| WO | 2014146116 A3 | 1/2015 | |
| WO | WO-2024200170 A1 * | 10/2024 | ............... G06N 7/01 |

OTHER PUBLICATIONS

"What is Google Smart Bidding?—The Ads Smart Bidding Strategy," Radd Interactive, a Division of Intero Digital, Copyright 2020, accessed Jul. 21, 2023, 8 pages, https://raddinteractive.com/what-is-google-smart-bidding-ads-smart-bidding-strategies.

* cited by examiner

*Primary Examiner* — Gigi L Dubasky
(74) *Attorney, Agent, or Firm* — Yee & Associates, P.C.

(57) ABSTRACT

A computer implemented method predicts a next frame. A number of processor units receives a sequence of frames for a live video stream for an activity. The number of processor units predicts a next frame for the live video stream for using the sequence of frames for the activity. The number of processor units determines a set of advertisement spaces in the next frame predicted for live video stream.

20 Claims, 9 Drawing Sheets

NEXT EVENT AND FRAME PREDICTION SYSTEM FOR LIVE VIDEO

BACKGROUND

The disclosure relates generally to an improved computer system and more specifically to predicting the next event and the next frame for live video.

Advertising on live video streams such as sporting events is an example of real time advertising. Advertising during live events such as soccer or football can reach large and engaged audiences in real time. These advertisements are placed in the frames in the live video stream in a manner that does not interfere with the viewer experience. For example, advertisements can be placed in open blank spaces within a video frame. The locations for advertisements in a video frame can include a blank wall, a grassy area on a field, a section on the side of the stadium, or other locations. These locations are advertising spaces.

Different algorithms and techniques are used for inserting advertisements and other information into live video streams. These techniques include content recognition to identify locations where advertisements can be inserted without interrupting the user experience. Dynamic ad insertion can be used to insert advertisement or other information into the video stream in real time as the frames in the video stream are being delivered to viewers. The advertisements can change dynamically throughout an event, meaning the different advertisements can be displayed at different times in the same advertisement spaces. The amount of time present for bidding and inserting advertisements in live video streams is short and can present challenges.

SUMMARY

According to an illustrative embodiment, a computer implemented method predicts a next frame. A number of processor units receives a sequence of frames for a live video stream for an activity. The number of processor units predicts a next frame of the live video stream for using the sequence of frames for the activity. The number of processor units determines a set of advertisement spaces in the next frame predicted for live video stream. According to other illustrative embodiments, a computer system and a computer program product for predicting the next frame are provided.

DETAILED DESCRIPTION

Figure 1:
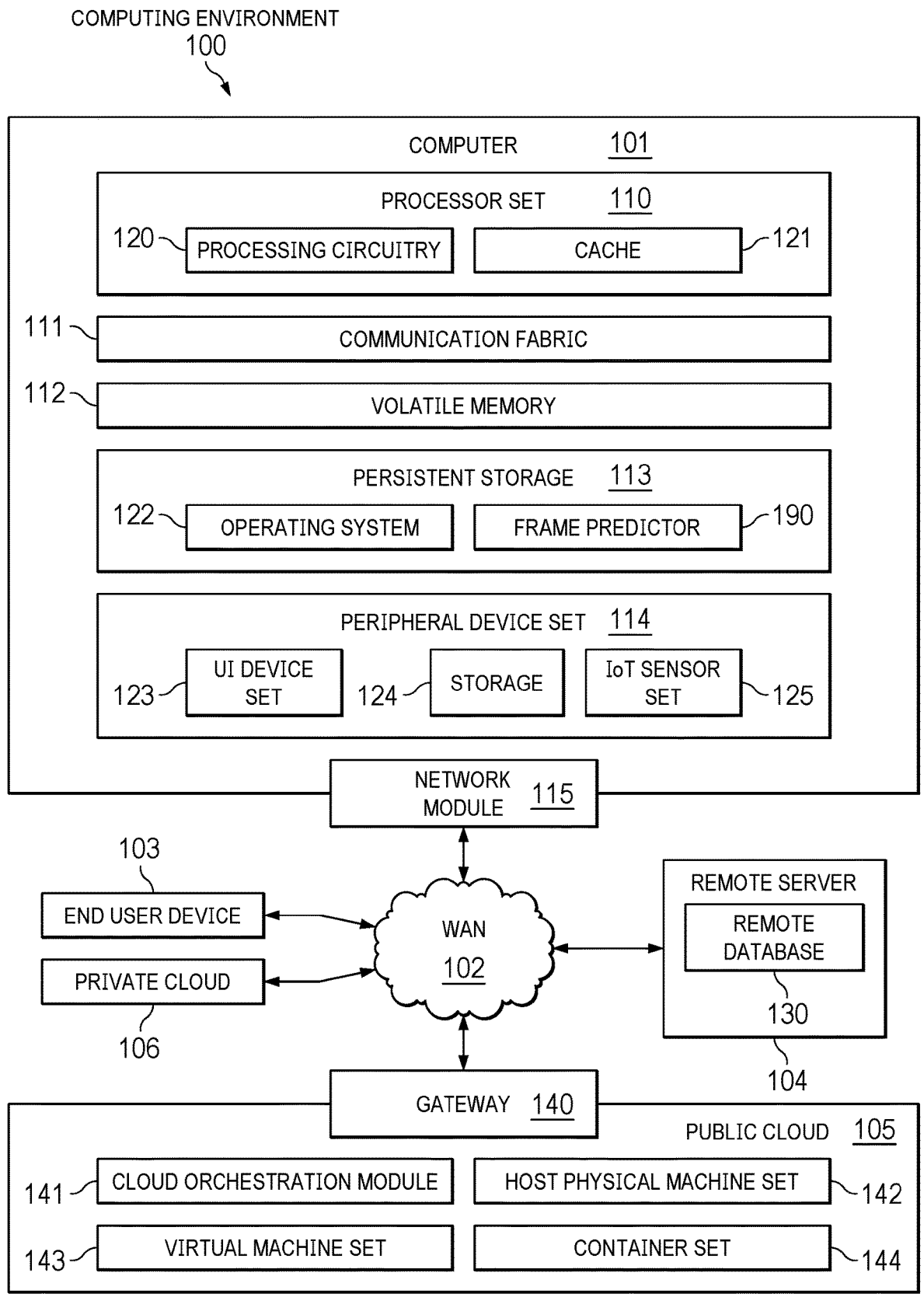
FIG. 1 is a block diagram of a computing environment in accordance with an illustrative embodiment.

A computer implemented method predicts a next frame. A number of processor units receives a sequence of frames for a live video stream for an activity. The number of processor units predicts the next frame for the live video stream for using the sequence of frames for the activity. The number of processor units determines a set of advertisement spaces in the next frame predicted for live video stream. As a result, the illustrative embodiments provide a technical effect of providing more time to perform actions on a future frame in a live video stream by predicting the next frame.

In the illustrative embodiments, as part of predicting the next frame, the number of processor units can predict the next frame using the sequence of frames received in the live video stream and a frame prediction machine learning model trained to predict the next frame for the live video stream. As a result, the illustrative embodiments can provide a technical effect of increasing the speed and accuracy in predicting a next frame.

In the illustrative embodiments, the frame prediction machine learning model can be trained to predict the next frame from the sequence of frames received in the live video stream and static video frames of an environment where the activity takes place. As result, the illustrative embodiments can provide a technical effect using a machine learning model that provides increased accuracy in predicting the next frame.

In the illustrative embodiments, as part of predicting the next frame, the number of processor units can predict an event for the next frame from the sequence of frames. The number of processor units predicts the next frame for the live video stream using the sequence of frames and the event predicted from the sequence of frames. Thus, the illustrative embodiments can provide a technical effect increasing accuracy in predicting the next frame using the sequence of frames and the event.

In the illustrative embodiments, as part of determining the set of advertisement spaces, the number of processor units can detect objects in the next frame and determine the set of advertisement spaces in the next frame based on positions of objects relative to potential advertising spaces in the next frame. Thus, the illustrative embodiments can provide a technical effect of detecting objects in the next frame and determining the set of advertisement spaces using the position of the objects.

In the illustrative embodiments, the number of the number of processor units can determine a bid for the set of advertisement spaces in the next frame. As a result, the illustrative embodiments can provide a technical effect of providing more time to determine bids by predicting the next frame.

In the illustrative embodiments, as part of determining the bid for the set of advertisement spaces, the number of processor units can predict a criticality for the set of advertising spaces in the next frame and determine the bid for the set of advertisement spaces based on the criticality determined for the set of advertising spaces in the next frame. Thus, the illustrative embodiments can provide a technical effect of determining more accurate bids using the criticality of the set of advertising spaces in the next frame.

In the illustrative embodiments, the number of processor units can determine whether the next frame matches a current frame received in the live video stream and places a bid for the set of advertising spaces in the next frame based on a criticality for the next frame determined in response to the next frame matching the current frame received in the live video stream. As a result, the illustrative embodiments can provide a technical effect of enabling bidding using the next frame when the next frame matches a current frame that is received.

In the illustrative embodiments, a sequence of frames can comprise a current frame and a number of past frames in the live video stream. As a result, the illustrative embodiments can provide a technical effect of using these frames for predicting the next frame.

A computer system comprises a number of processor units. The number of processor units executes program instructions to receive a sequence of frames for a live video stream for an activity. The number of processor units executes program instructions to predict a next frame for the live video stream for using the sequence of frames for the activity. The number of processor units executes program instructions to determine a set of advertisement spaces in the next frame predicted for live video stream. As a result, the illustrative embodiments provide a technical effect of providing more time to perform actions on a future frame in a live video stream by predicting the next frame.

In the illustrative embodiments, as part of predicting the next frame, the number of processor units can further execute program instructions to predict the next frame using the sequence of frames received in the live video stream and a frame prediction machine learning model trained to predict the next frame for the live video stream. As a result, the illustrative embodiments can provide a technical effect of increasing the speed and accuracy in predicting a next frame.

In the illustrative embodiments, the frame prediction machine learning model can be trained to predict the next frame from the sequence of frames received in the live video stream and static video frames of an environment where the activity takes place. As result, the illustrative embodiments can provide a technical effect using a machine learning model that provides increased accuracy in predicting the next frame.

In the illustrative embodiments, as part of predicting the next frame, the number of processor units can further execute program instructions to predict an event for the next frame from the sequence of frames and predict the next frame for the live video stream using the sequence of frames and the event predicted from the sequence of frames. Thus, the illustrative embodiments can provide a technical effect increasing accuracy in predicting the next frame using the sequence of frames and the event.

In the illustrative embodiments, as part of determining the set of advertisement spaces, the number of processor units can further execute program instructions to detect objects in the next frame and determine the set of advertisement spaces in the next frame based on positions of objects relative to potential advertising spaces in the next frame. Thus, the illustrative embodiments can provide a technical effect of detecting objects in the next frame and determining the set of advertisement spaces using the position of the objects.

In the illustrative embodiments, the number of processor units can further execute program instructions to determine a bid for the set of advertisement spaces in the next frame. As a result, the illustrative embodiments can provide a technical effect of providing more time to determine bids by predicting the next frame.

In the illustrative embodiments, as part of determining the bid for the set of advertisement spaces, the number of processor units can further execute program instructions to predict a criticality for the set of advertising spaces in the next frame and determine the bid for the set of advertisement spaces based on the criticality determined for the set of advertising spaces in the next frame. Thus, the illustrative embodiments can provide a technical effect of determining more accurate bids using the criticality of the set of advertising spaces in the next frame.

In the illustrative embodiments, the number of processor units can further execute program instructions to determine whether the next frame matches a current frame received in the live video stream and place a bid for the set of advertising spaces in the next frame based on a criticality for the next frame determined in response to the next frame matching the current frame received in the live video stream. As a result, the illustrative embodiments can provide a technical effect of enabling bidding using the next frame when the next frame matches a current frame that is received.

In the illustrative embodiments, the sequence of frames can comprise a current frame and a number of past frames in the live video stream. As a result, the illustrative embodiments can provide a technical effect of using these frames for predicting the next frame.

A computer program product for predicting a next frame in which the computer program product comprising a computer readable storage medium having program instructions embodied therewith. The program instructions are executable by a computer system to cause the computer system to receive a sequence of frames for a live video stream for an activity; predict the next frame for the live video stream for using the sequence of frames for the activity; and determine a set of advertisement spaces in the next frame predicted for live video stream. As a result, the illustrative embodiments provide a technical effect of providing more time to perform actions on a future frame in a live video stream by predicting the next frame.

In the illustrative embodiments, as part of predicting the next frame, the program instructions can be further executable by the computer system and further cause the computer system to predict the next frame using the sequence of frames received in the live video stream and a frame prediction machine learning model trained to predict the next frame for the live video stream. As a result, the illustrative embodiments can provide a technical effect of increasing the speed and accuracy in predicting a next frame.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as frame predictor 190. In addition to frame predictor 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and frame predictor 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in frame predictor 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in frame predictor 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. Advertisers can bid on advertisement spaces using real time bidding. Predefined advertisement spaces can be present within the video frames of the live video stream and these spaces can be put up for auction in which different advertisers bid on advertisement spaces.

Challenges are present with this type of real time bidding for advertisement space in live video streams. For example, latency is a factor because of the amount of time for bidding and inserting advertisements into frames in a live video stream. The real time bidding, selecting the winning bid, and then placing the ad happens in a very short period of time. As a result, identifying and bidding on advertisement space that is important to a particular advertiser can be difficult with the limited amount of time to identify and bid on ad spaces. With the unpredictable nature of live activities such as football or soccer games, increased complexity is present in real time bidding and ad insertion.

Thus, the illustrative examples provide a computer implemented method, apparatus, computer system, and computer program product for bidding on advertisements for a live video stream. In one illustrative example, a computer implemented method enables predicting a next frame for a real time advertisement. This prediction of the next frame provides an increased amount of time to determine and bid on advertisement spaces in frames in a live video stream. An illustrative example enables obtaining more time to identify ad spaces and bid on ad spaces for frames in a live video stream. The increased amount of time is enabled through predicting the next frame in a video stream, identifying the ad space in that video stream and bidding on that ad space. This bidding can occur before or in response to receiving a frame that sufficiently matches the next frame that was predicted. In this illustrative example, the prediction of the next frame can be performed using machine learning models such as neural networks. In one example, an encoder decoder based next frame prediction neural network is used to predict the next frame in a live video stream.

Figure 2:
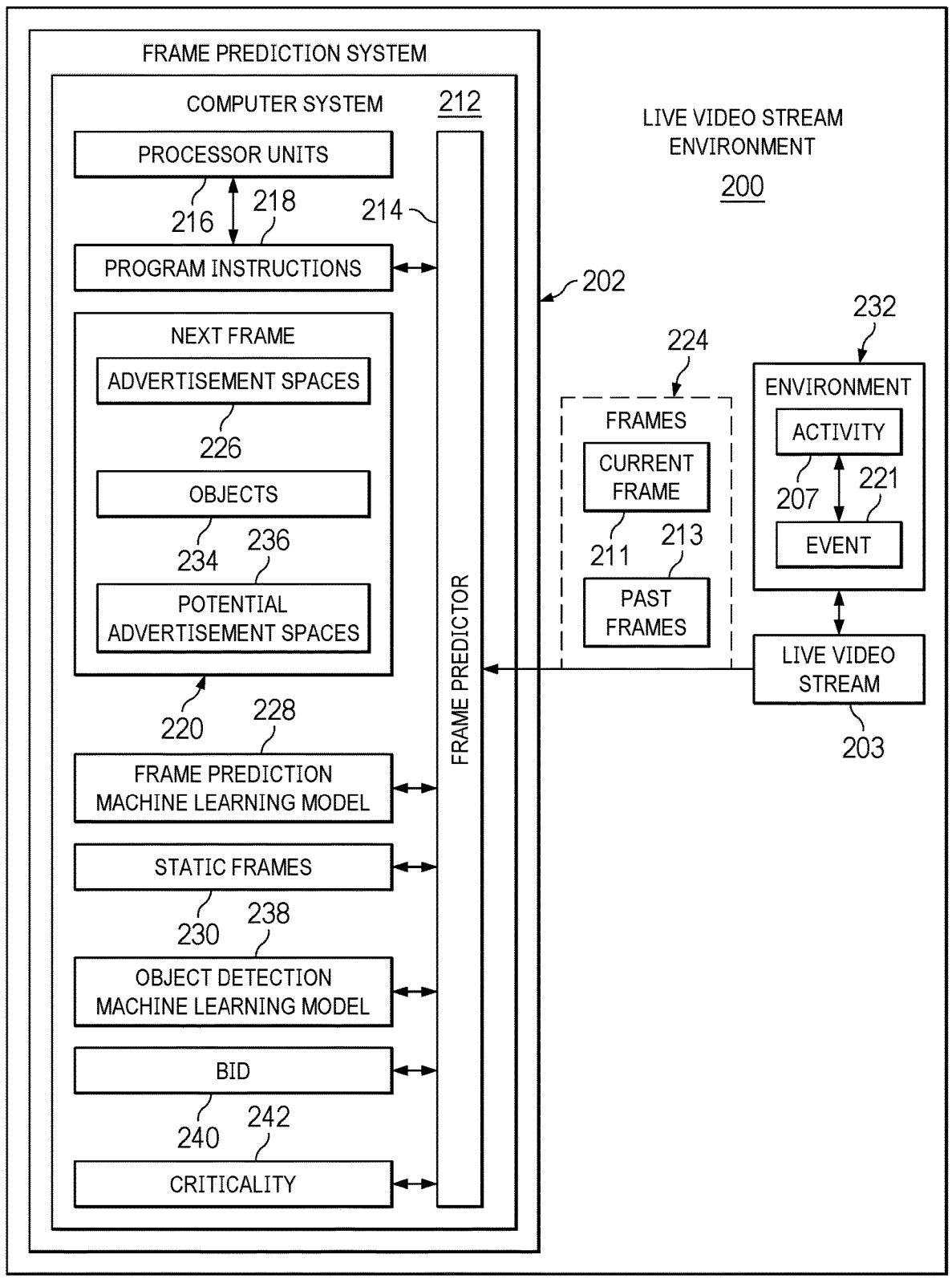
FIG. 2 is a block diagram of a live video stream environment in accordance with an illustrative embodiment.

With reference now to FIG. 2, a block diagram of a live video stream environment is depicted in accordance with an illustrative embodiment. In this illustrative example, live video stream environment 200 includes components that can be implemented in hardware such as the hardware shown in computing environment 100 in FIG. 1. In this example, frame prediction system 202 can predict future frames for live video stream 203. In this example, live video stream 203 can be for activity 207. Activity 207 can be, for example, a sporting event, a debate, a town hall, or some other activity. The prediction of future frames for live video stream 203 can be used to identify spaces to insert information such as advertisement spaces 226.

In this illustrative example, frame prediction system 202 comprises computer system 212 and frame predictor 214. Frame predictor 214 is located in computer system 212. Frame predictor 214 may be implemented using frame predictor 190 in FIG. 1.

Frame predictor 214 can be implemented in software, hardware, firmware or a combination thereof. When software is used, the operations performed by frame predictor 214 can be implemented in program instructions configured to run on hardware, such as a processor unit. When firmware is used, the operations performed by frame predictor 214 can be implemented in program instructions and data and stored in persistent memory to run on a processor unit. When hardware is employed, the hardware can include circuits that operate to perform the operations in frame predictor 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, frame predictor 214 receives a sequence of frames 224 in live video stream 203 for activity 207. In this example, a sequence of frames 224 can comprise current frame 211 that has just been received in live video stream 203 and a number of past frames 213 previously received in live video stream 203. Frame predictor 214 predicts next frame 220 in live video stream 203 using the sequence of frames 224 received in live video stream 203. In this example, next frame 220 can be a prediction of the next frame that will be received. For example, next frame 220 can be a prediction of the next actual frame received in live video stream 203. In another illustrative example, next frame 220 can be an Nth future frame received in live video stream 203. For example, next frame 220 can be a prediction of a frame that will be 2 or 5 frames into the future for live video stream 203.

In this illustrative example, the prediction of next frame 220 can be performed using a sequence of frames 224 received in live video stream 203 and frame prediction machine learning model 228. Frame prediction machine learning model 228 is trained to predict next frame 220 for live video stream 203. In one illustrative example, wherein frame prediction machine learning model 228 is trained to predict next frame 220 from the sequence of frames 224 received in live video stream and static video frames 230 of environment 232 in which activity 207 takes place.

In this illustrative example, static video frames 230 is a collection of frames for environment 232. For example, if activity 207 is a soccer match, environment 232 can be a stadium in which the soccer match occurs. Static video frames 230 can be frames of the stadium including the field, goalposts, seats, banners, display boards, and other objects in the stadium. In this example, static video frames 230 can provide a view of all of environment 232.

In this example, static video frames 230 are used as an input into frame prediction machine learning model 228 along with the sequence of frames 224 for live video stream 203 of activity 207 occurring in environment 232. These inputs are used by frame prediction machine learning model 228 to predict next frame 220 for live video stream 203 before another frame is received that corresponds to the prediction of next frame 220.

Additionally, in predicting next frame 220, frame prediction machine learning model 228 can also take into account event 221 for next frame 220. In this example, event 221 is for activity 207 for which live video stream 203 is generated. For example, event 221 is an occurrence or action that takes place during activity 225. In these examples, event 221 is a significant occurrence or action. For example, when activity 207 is a soccer match, an event can be for example, a goal, an assist, a foul, a yellow card penalty, a shootout, a substitution, a free kick, or other event. The occurrence of different events can have different levels of significance or interest to a viewing audience for live video stream 203.

In this example, next frame 220 can occur in event 221 as a current event or as a future event. This example, frame predictor 214 can predict event 221 for next frame 220 from the sequence of frames 224. This prediction can also be made by frame predictor 214 using frame prediction machine learning model 228. In this example, frame prediction machine learning model 228 can also be trained to predict events based on sequences of frames. For example, if sequence of frames 224 shows a referee signaling a penalty, frame prediction machine learning model 228 can predict that event 221 will be a free kick and can predict next frame 220 using the prediction of event 221 being a free kick. In another example, the sequence of frames may show a player preparing for a free kick. In this case, event 221 is predicted to be a free kick which is also the current event. This current event is used to predict next frame 220 in this example.

Frame predictor 214 predicts next frame 220 for live video stream 203 using the sequence of frames 224 and event 221 predicted from the sequence of frames 224.

In this illustrative example, frame predictor 214 determines a set of advertisement spaces 226 in next frame 220 that is predicted for live video stream 203. As used herein, a "set of" when used with reference items means one or more items. For example, a set of advertisement spaces 226 is one or more of advertisement spaces 226.

In this illustrative example, frame predictor 214 can determine a set of advertisement spaces 226 in next frame 220. Frame predictor 214 detects objects 234 in next frame 220. Frame predictor 214 can determine the set of advertisement spaces 226 in next frame 220 based on positions of objects 234 relative to potential advertisement spaces 236 in next frame 220 In this example, frame predictor 214 can detect objects 234 using object detection performed by object detection machine learning model 238. In this example, identifying objects 234 takes account in identifying the set of advertisement spaces 226 from potential advertisement spaces 236 are static objects. In other cases, moving objects in objects 234 can also be taken into account.

In the prediction of next frame 220, frame predictor 214 can also operate to determine bid 240 for the set of advertisement spaces 226 in next frame 220. Bid 240 for the set of advertisement spaces 226 can be for a portion or all of advertisement spaces 226 in the set of advertisement spaces 226. In this illustrative example, frame predictor 214 can implement currently available smart bidding algorithms for bid 240. These smart bidding algorithms can be implemented or modified to take into account factors associated with predicting next frames in live video stream 203. Further, these algorithms can take into account the additional factors that current techniques cannot use due to the lack of time to generate bids to insert information in future frames.

In one illustrative example, frame predictor 214 can determine bid 240 in a manner that takes into account criticality 242. Criticality 242 can indicate the importance of next frame 220, event 221, a segment of time in an event 221, or other future frames in addition to next frame 220. Criticality 242 can be, for example, represented as high or low, a numeric scale from 1 to 5, a scale of high, median, and low, or using other scales.

For example, frame predictor 214 can predict criticality 242 for the set of advertisement spaces 226 in next frame 220. For example, frame predictor 214 can predict criticality 242 of next frame 220 using a set of event related factors for event 221. These event related factors can be used to determine the criticality of next frame 220 based on the relationship of next frame 220 in event 221. For example, with event 221 being a shootout in a soccer match, event 221 can be predicted to be 3 minutes and 30 seconds. This time can be divided into 30 second segments. The first two segments can have a medium criticality, the next two segments can have a high criticality, and the last three segments can have a low criticality.

Frame predictor 214 can determine bid 240 for the set of advertisement spaces 226 based on criticality 242 determined for the set of advertisement spaces 226 in next frame 220. In one example, criticality 242 can take into account factors such as user, team, player, event 221, a segment of time in event 221, or other factors.

In this illustrative example, frame predictor 214 can determine whether next frame 220 matches current frame 211 received in live video stream 203 corresponds to next frame 220. In this example, frame predictor 214 places bid 240 for the set of advertisement spaces 226 in next frame 220 based on criticality 242 determined in response to next frame 220 matching current frame 211 received in live video stream 203. If a match is not present, then normal bidding for frames received in live video streams can be used. In other illustrative examples, the bid can be submitted and evaluated even before a determination is made as to whether next frame 220 will match current frame 211 before current frame 211 is received in live video stream 203.

Thus, the illustrative examples provide an ability to increase the amount of time available to bids or frames in live video streams through predicting the next frame for the video stream. In one illustrative example, the next frame can be the very next frame that is received as a current frame. In another example, the next frame can be for a future frame that will be received some number of frames after the current frame is received. Further, with the illustrative example, a criticality of the frame can be determined for the set of advertisement spaces in the next frame. In this manner, more accurate bids can be made based on determining the criticality of advertisement spaces in a frame.

With the ability to predict a next frame and a set of advertisement spaces for the next frame, increased time is provided for determining what advertisements should be placed in the next frame when it is received in the live video stream. In the different illustrative examples, increased time is provided to determine a bid for the next frame. With additional time, other factors such as the criticality of advertisement space within the next frame can also be determined and used to determine a bid for advertising space in that next frame.

In one illustrative example, one or more technical solutions are present that overcome a problem with having sufficient time to perform various actions with respect to frames received in a live video stream. As a result, one or more technical solutions may provide an effect increasing the amount of time for performing actions on frames received in a video stream through predicting the receipt of those future frames and performing actions based on the prediction of future frames in a live video stream.

In the illustrative example, the use of frame predictor 214 in computer system 212 integrates processes into a practical application for method preamble predicting the next frame in a video stream that increases the performance of computer system 212 providing more time to perform actions with respect to frames in a video stream through predicting the future frames and determining actions for those future frames prior to the future frames being received. In other words, frame predictor 214 in computer system 212 is directed to a practical application of processes integrated into frame predictor 214 in computer system 212 that predicts a next frame in a live video stream using a sequence of frames for an activity. Frame predictor 214 also determines a set of advertisement spaces in the next frame predicted for the live video stream. This prediction enables determining bids for advertisement space in future frames prior to those future frames being received.

Computer system 212 can be configured to perform at least one of the steps, operations, or actions described in the different illustrative examples using software, hardware, firmware or a combination thereof. As a result, computer system 212 operates as a special purpose computer system in which frame predictor 214 in computer system 212 enables predicting the next frame to provide additional time performing actions such as bidding on advertisement spaces. In particular, frame predictor 214 transforms computer system 212 into a special purpose computer system as compared to currently available general computer systems that do not have frame predictor 214.

The illustration of live video stream environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, live video streams can be received from one or more environments in addition to or in place of environment 232. Further, one or more machine learning models for frame prediction and object detection can be present in frame prediction system 202. These additional machine learning models can be present for use in other environments in addition to or in place of environment 232. For example, a different machine learning model can be used for a soccer match as compared to a debate. Yet another different type of machine learning model can be used for a tennis or chess match.

Further, the illustrative examples describe predicting a single next frame. In other illustrative examples, more than next frames can be predicted. For example, N+1 next frames can be predicted in the different illustrative examples.

Figure 3:
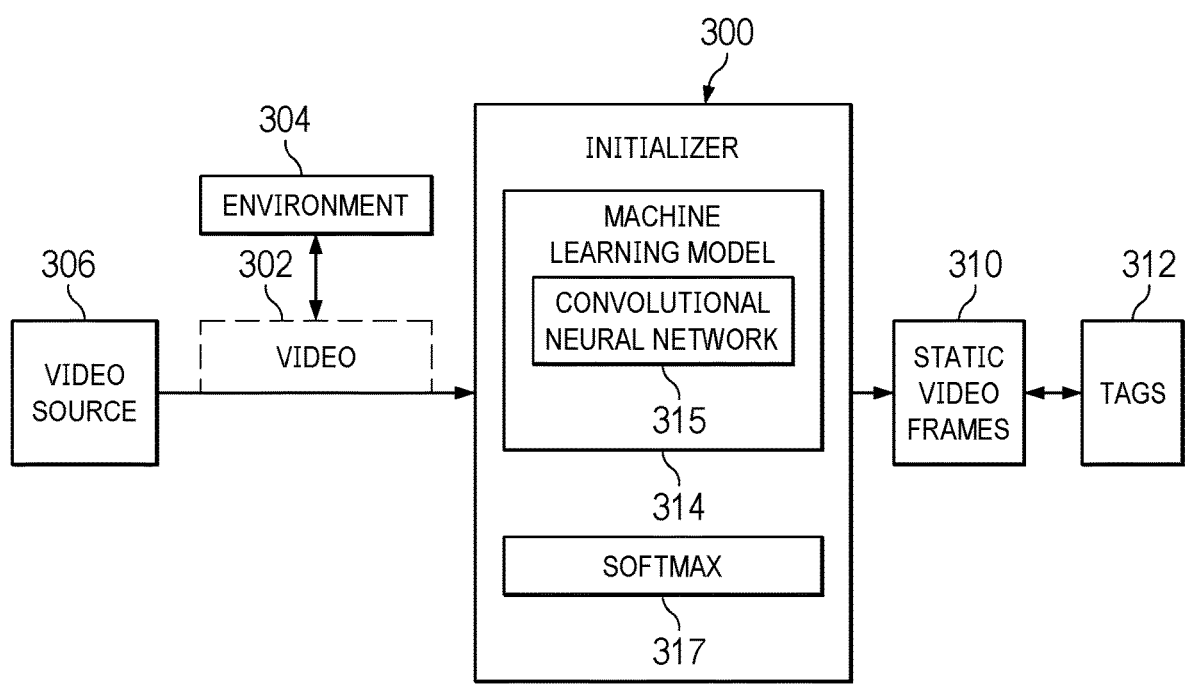
FIG. 3 is a dataflow for generating static video frames in accordance with an illustrative embodiment.

Turning next to FIG. 3, a dataflow for generating static video frames is depicted in accordance with an illustrative embodiment. In this illustrative example, initializer 300 can receive video 302 of an environment 304 from video source 306. In this example, environment 304 can be, for example, a stadium, an auditorium, a theater, or other location where an activity of which a live video stream will be generated. In this example, video source 306 can be a camera system generating video 302 of environment 304, a storage system containing video 302, or some of the of video 302.

In this illustrative example, initializer 300 analyzes environment 304 using video 302. This analysis includes identifying objects such as seats, a field, goalposts, perimeter boards, banners, or other objects. This analysis can also include determining what events can occur in an activity in environment 304.

In response to performing the analysis, initializer 300 generates static video frames 310 with tags 312. Each static video frame can have one or more tags. In this illustrative example, tags 312 can identify various things with respect to objects and events relating to static video frames 310. For example, tags 312 can indicate at least one of an object, a goalpost, a seat, a field, a banner, a perimeter board, a large screen television, a stage, a goalpost view, a penalty shot view, center court, a yard line, a dugout, a podium, and other items. Additionally, if the tag identifies an object as an advertisement space, the tag can also include coordinates of the advertisement space.

In this illustrative example, initializer 300 can be implemented using machine learning model 314. Machine learning model 314 can be, for example, a convolutional neural network 315 used in conjunction with softmax 317. Softmax 317 is a function in machine learning and can be used to classify objects in video 302. Machine learning model 314 as a convolutional neural network can be trained using deep learning to automatically learn special hierarchies and identify faces, objects, or signs. The information extracted by the convolutional neural network can be used for tasks involving activity recognition, object detection, and understanding scenes.

Figure 4:
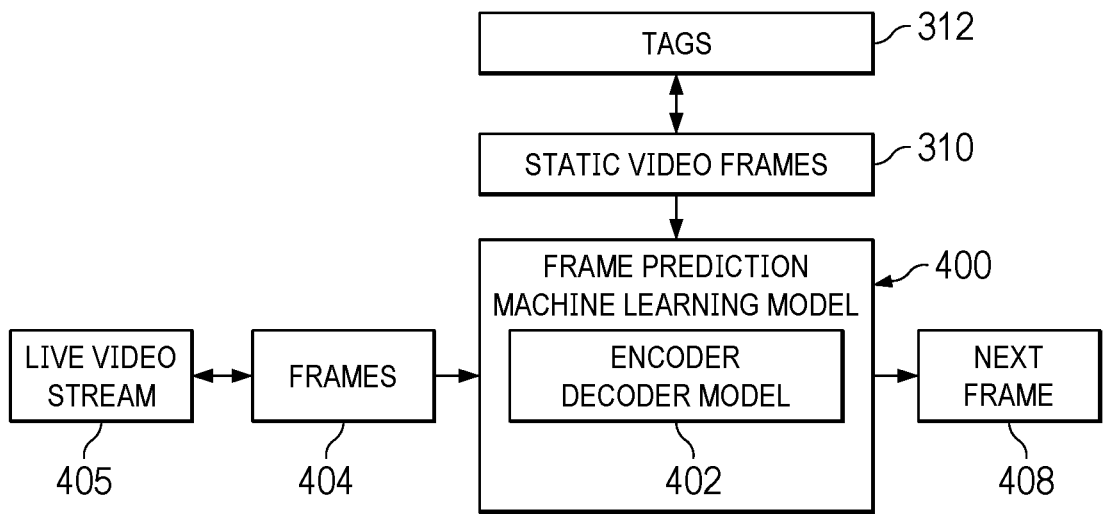
FIG. 4 is a dataflow for predicting a next frame in accordance with an illustrative embodiment.

Turning now to FIG. 4, a dataflow for predicting a next frame is depicted in accordance with an illustrative embodiment. In this example, frame prediction machine learning model 400 is an example of an implementation for frame prediction machine learning model 228 in FIG. 2. In the illustrative examples, the same reference numeral may be used in more than one figure. This reuse of a reference numeral in different figures represents the same element in the different figures.

In this illustrative example, frame prediction machine learning model 400 can be implemented using encoder decoder model 402. Encoder decoder is a type of machine learning model architecture that can handle different lengths in the input and output.

In this example, a sequence of frames 404 for live video stream 405 are input into frame prediction machine learning model 400. The sequence of frames are actual live video. Static video frames 310 with tags 312 were generated by initializer 300 in FIG. 3. In this example, static video frames 310 are for the same environment in which sequence of frames 404 are generated as part of live video stream 405.

In this example, frame prediction machine learning model 400 predicts and outputs next frame 408 using the sequence of frames 404 and static video frames 310 with tags 312.

Figure 5:
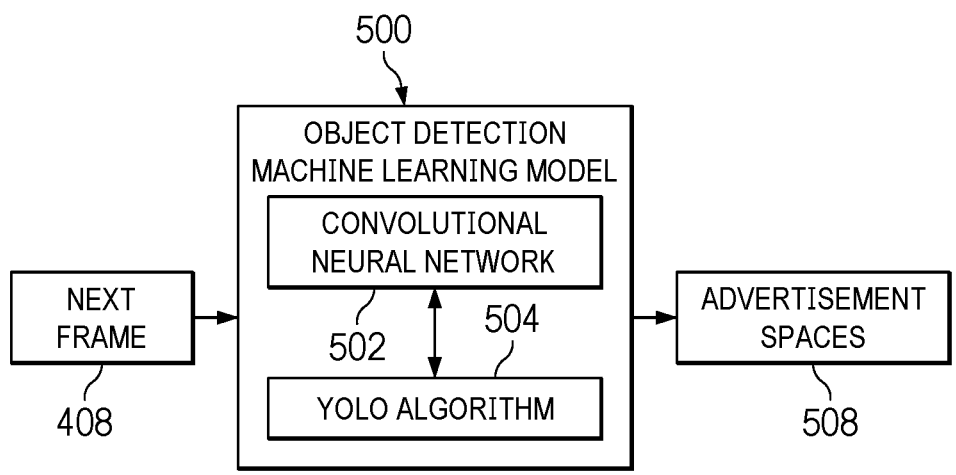
FIG. 5 is a dataflow for detecting objects in accordance with an illustrative embodiment.

With reference next to FIG. 5, a dataflow for detecting objects is depicted in accordance with an illustrative embodiment. In this illustrative example, object detection machine learning model 500 is an example of an implementation for object detection machine learning model 238 in FIG. 2.

As depicted, object detection machine learning model 500 comprises convolutional neural network 502 that uses you only look once (YOLO) algorithm 504. In this example, object detection machine learning model 500 receives next frame 408 as an input. Next frame 408 was generated by frame prediction machine learning model 400 in FIG. 4.

Next frame 408 is an example of a frame predicted by frame prediction machine learning model 400 in FIG. 4. In this example, YOLO algorithm 504 divides next frame 408 integrated with each cell in the grid predicting some number of bounding boxes and class probabilities. The bounding box can contain an object. The class probabilities indicate the type of object. For example, object detection machine learning model 500 can be trained to detect objects such as players, advertising boards, panels, and other objects. In this example, convolutional neural network 502 is used to learn extract features from the input image which are used by YOLO algorithm 504 to output identifications of objects in next frame 408 such as a set of advertisement spaces 508. In this example, the set of advertisement spaces 508 is an example of the set of advertisement spaces 226 in FIG. 2. In this example, the set of advertisement spaces 508 include descriptions of coordinates in next frame 408 that contain a set of advertisement spaces 508.

Figure 6:
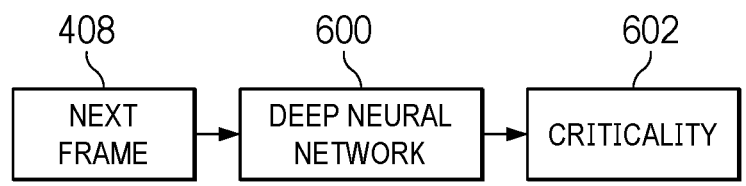
FIG. 6 is a dataflow for determining criticality of a next frame in accordance with an illustrative embodiment.

Next in FIG. 6, a dataflow for determining criticality of a next frame is depicted in accordance with an illustrative embodiment. In this example, deep neural network 600 is an example of a machine learning model that can be used to determine criticality to have advertisement space in a next frame predicted for a live video stream.

As depicted, deep neural network 600 receives next frame 408. Next frame 408 was generated by frame prediction machine learning model 400 in FIG. 4. In this illustrative example, deep neural network 600 outputs criticality 602. Neural network 600 has been trained to determine criticality for a frame based on different criticality factors. These factors can include, for example, audience, event, time, or other factors relating to the environment for the live video stream.

Criticality 602 can be a set of levels for different criticalities identified using strings, numerals, or other mechanisms for identifying different levels of criticality. In this example, criticality 602 also includes probabilities of each level. For example, criticality 602 can be high, medium, and low. Criticality 602 can be used by an advertiser or other entity to enter a bid for advertisement space in next frame 408.

Figure 7:
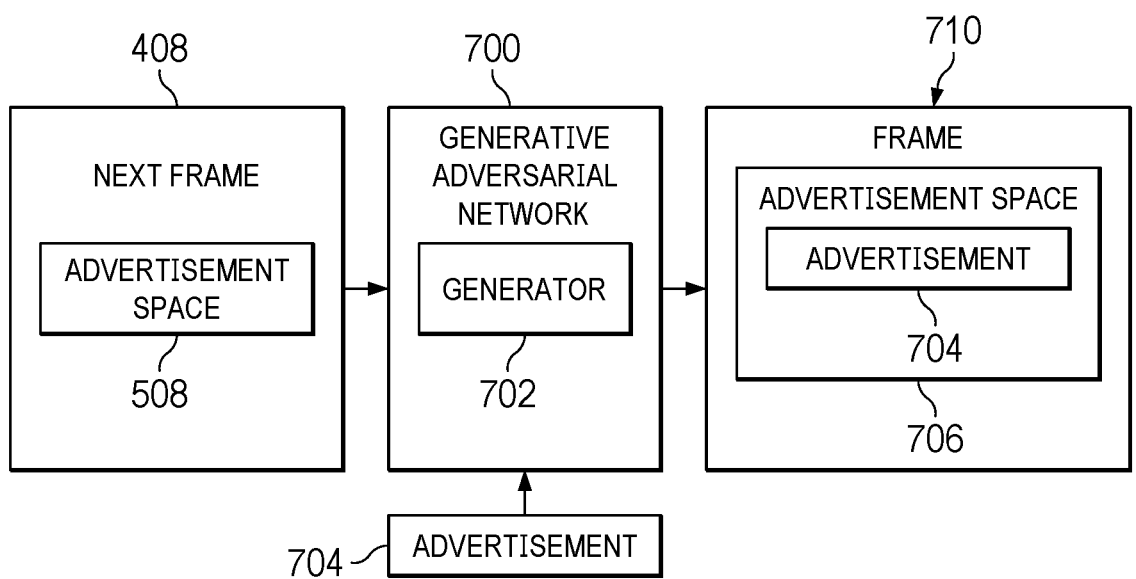
FIG. 7 is a dataflow for inserting an advertisement in accordance with an illustrative embodiment.

In FIG. 7, a dataflow for inserting an advertisement is depicted in accordance with an illustrative embodiment. In this illustrative example, generative adversarial network 700 generates next frame 408 and advertisement 704. Advertisement 704 is an advertisement to be placed into an advertisement space in the set of advertisement spaces 508 within next frame 408.

A generative adversarial network typically includes a generator and a discriminator. The generator generates samples of data such as frames and attempts to convince the discriminator that the frames are real. The discriminator attempts to distinguish between real and fake frames. Machine learning models are trained in competition with each other to increase accuracy in generating frames that are considered to be real.

In this illustrative example, generator 702 in generative adversarial network 700 has been trained to place advertisements in frames such that the frames cannot be distinguished from actual frames with advertisements. In this illustrative example, generator 702 receives advertisement 704 and next frame 408 with a set of advertisement spaces 508. Generator 702 generates frame 710 containing advertisement 704 and advertisement space 706 in place of the actual frame in the live video stream.

Figure 8:
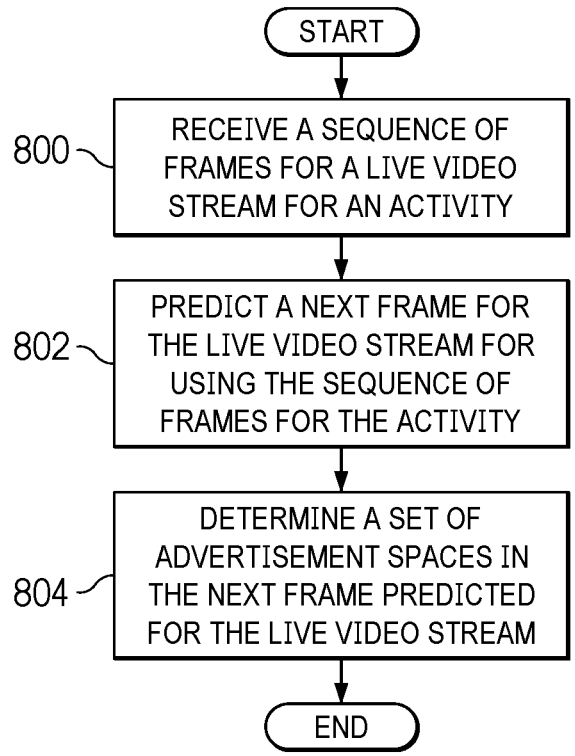
FIG. 8 is a flowchart of a process for predicting a next frame in accordance with an illustrative embodiment.

Turning next to FIG. 8, a flowchart of a process for predicting a next frame is depicted in accordance with an illustrative embodiment. The process in FIG. 8 can be implemented in hardware, software, or both. When implemented in software, the process can take the form of program instructions that are run by one or more processor units located in one or more hardware devices in one or more computer systems. For example, the process can be implemented in frame predictor 214 in computer system 212 in FIG. 2.

The process begins by receiving a sequence of frames for a live video stream for an activity (step 800). The process predicts a next frame for the live video stream for using the sequence of frames for the activity (step 802).

The process determines a set of advertisement spaces in the next frame predicted for the live video stream (step 804). The process terminates thereafter.

Figure 9:
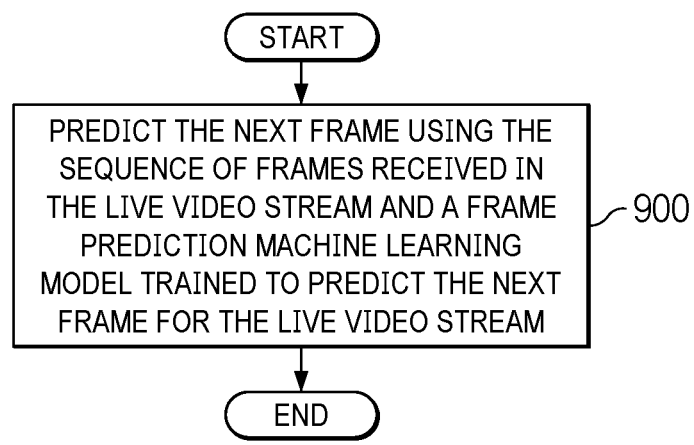
FIG. 9 is a flowchart of a process for predicting a next frame in accordance with an illustrative embodiment.

With reference now to FIG. 9, a flowchart of a process for predicting a next frame is depicted in accordance with an illustrative embodiment. The process in this flowchart is an example of an implementation for step 802 in FIG. 8.

The process predicts the next frame using the sequence of frames received in the live video stream and a frame prediction machine learning model trained to predict the next frame for the live video stream (step 900). The process terminates thereafter. In step 900, the frame prediction machine learning model is trained to predict the next frame from the sequence of frames received in the live video stream and the static video frames of the environment in which the activity takes place.

Figure 10:
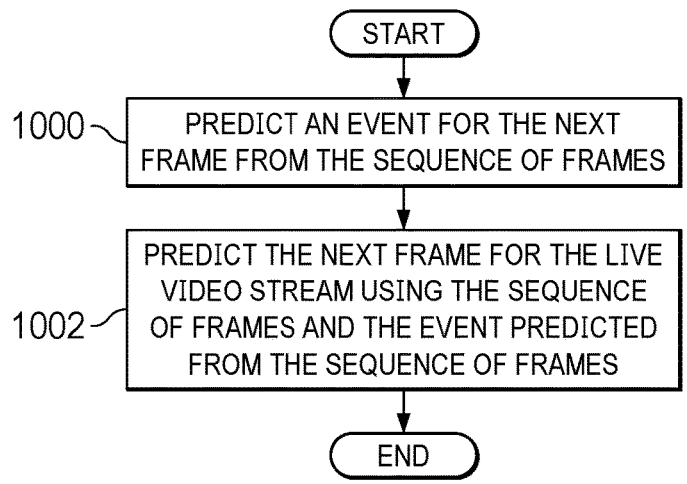
FIG. 10 is a flowchart of a process for predicting the next frame in accordance with an illustrative embodiment.

In FIG. 10, a flowchart of a process for predicting the next frame is depicted in accordance with an illustrative embodiment. The process in this flowchart is an example of an implementation for step 802 in FIG. 8.

The process predicts an event for the next frame from the sequence of frames (step 1000). The process predicts the next frame for the live video stream using the sequence of frames and the event predicted from the sequence of frames (step 1002). The process terminates thereafter.

Figure 11:
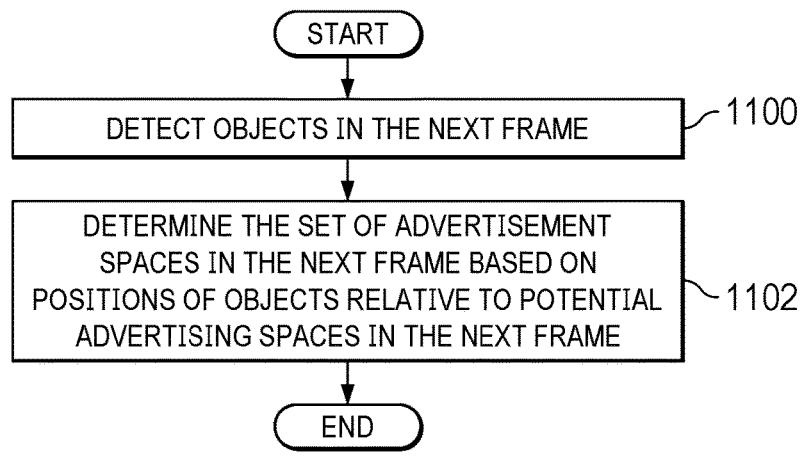
FIG. 11 is a flowchart of a process for determining a set of advertising spaces in accordance with an illustrative embodiment.

With reference to FIG. 11, a flowchart of a process for determining a set of advertising spaces is depicted in accordance with an illustrative embodiment. The process in this flowchart is an example of an implementation for step 804 in FIG. 8.

The process detects objects in the next frame (step 1100). The process determines the set of advertisement spaces in the next frame based on positions of objects relative to potential advertising spaces in the next frame (step 1102). The process terminates thereafter.

Figure 12:
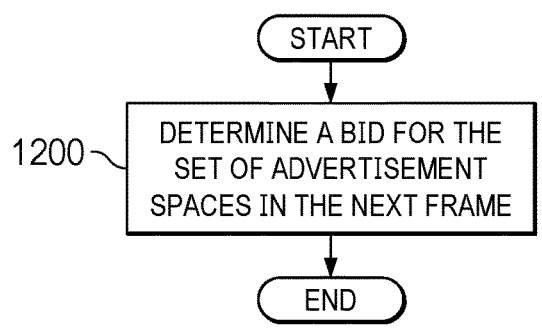
FIG. 12 is a flowchart of a process for determining a bid in points with an illustrative embodiment.

Turning to FIG. 12, a flowchart of a process for determining a bid is depicted in points with an illustrative embodiment. The process in this flowchart is an example of an additional step that can be performed with the steps in FIG. 8.

The process determines a bid for the set of advertisement spaces in the next frame (step 1200). The process terminates thereafter.

Figure 13:
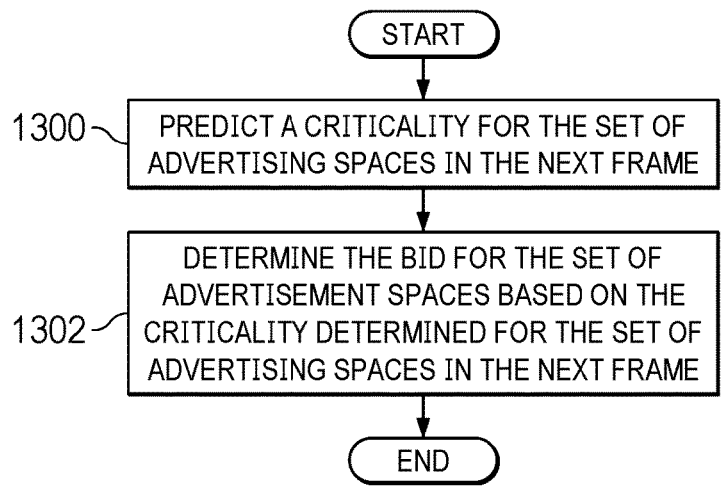
FIG. 13 is a flowchart of a process for determining a bid for a set of advertisement spaces in accordance with an illustrative embodiment.

Next in FIG. 13, a flowchart of a process for determining a bid for a set of advertisement spaces is depicted in accordance with an illustrative embodiment. The process in FIG. 13 is an example of an implementation of step 1200 in FIG. 12.

The process predicts a criticality for the set of advertising spaces in the next frame (step 1300). The process determines the bid for the set of advertisement spaces based on the criticality determined for the set of advertising spaces in the next frame (step 1302). The process terminates thereafter.

Figure 14:
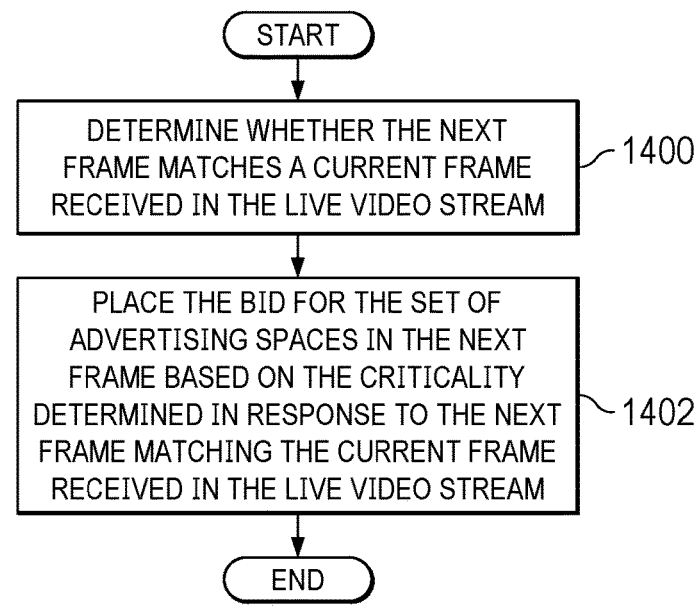
FIG. 14 is a flowchart of a process for processing an incoming frame in a live video stream in accordance with an illustrative embodiment.

With reference now to FIG. 14, a flowchart of a process for processing an incoming frame in a live video stream is depicted in accordance with an illustrative embodiment. The process in this figure is an example of additional steps that can be performed with the steps in FIG. 8.

The process determines whether the next frame matches a current frame received in the live video stream (step 1400). The process places the bid for the set of advertising spaces in the next frame based on the criticality determined in response to the next frame matching the current frame received in the live video stream (step 1402). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
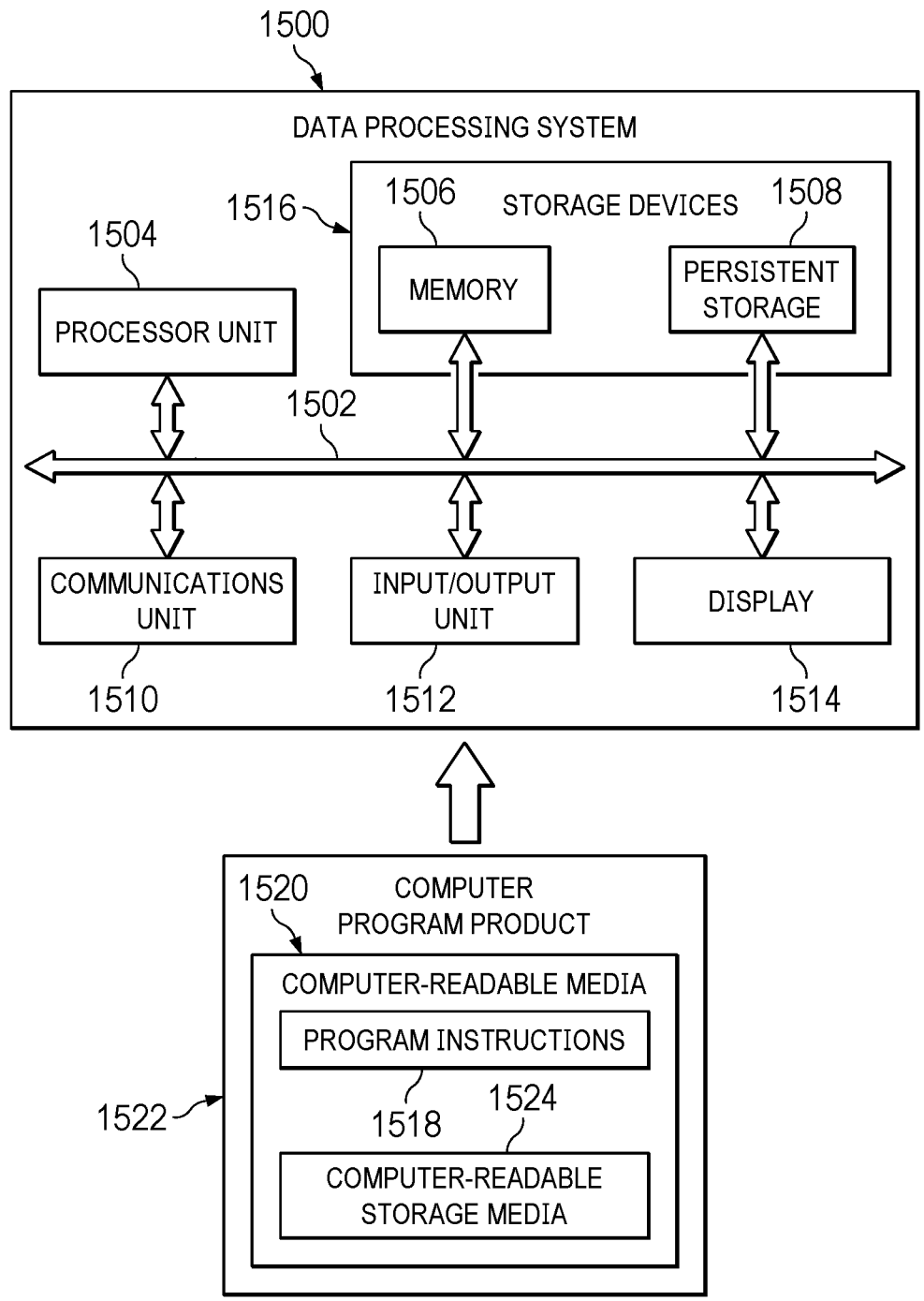
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 are located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments provide a computer implemented method, computer system, and computer program product for predicting a next frame. In one illustrative example, A computer implemented method predicts a next frame. A number of processor units receives a sequence of frames for a live video stream for an activity. The number of processor units predicts a next frame for the live video stream for using the sequence of frames for the activity. The number of processor units determines a set of advertisement spaces in the next frame predicted for live video stream.

Thus, with the ability to predict a next frame and a set of advertisement spaces for the next frame, increased time is provided for determining what advertisements should be placed in the next frame when it is received in the live video stream. In the different illustrative examples, increased time is provided to determine a bid for the next frame. With additional time, other factors such as the criticality of advertisement space within the next frame can also be determined and used to determine a bid for advertising space in that next frame.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for predicting an event in a next frame, the computer implemented method comprising:
   receiving, by a number of processor units, a sequence of frames for a live video stream for an activity;
   predicting, by the number of processor units, utilizing a frame prediction machine learning model trained to predict the event in the next frame for the live video stream from the sequence of frames for the activity and static video frames of an environment in which the activity takes place;
   determining, by the number of processor units, whether the next frame matches a current frame received in the live video stream;
   determining, by the number of processor units, a set of advertisement spaces in the next frame predicted for the live video stream based on positions of objects in the next frame relative to potential advertisement spaces;
   placing, by the number of processor units, a bid for a set of advertising spaces in the next frame based on a criticality for the next frame determined in response to the next frame matching the current frame received in the live video stream; and
   updating, by the number of processor units, the set of advertisement spaces in response to changes in predicted events during the live video stream.

2. The computer implemented method of claim 1, wherein the frame prediction machine learning model is trained to predict the next frame from the sequence of frames received in the live video stream and static video frames of an environment in which the activity takes place.

3. The computer implemented method of claim 1, wherein predicting, by the number of processor units, the next frame comprises:
   predicting, by the number of processor units, an event for the next frame from the sequence of frames; and
   predicting, by the number of processor units, the next frame for the live video stream using the sequence of frames and the event predicted from the sequence of frames.

4. The computer implemented method of claim 1, wherein determining, by the number of processor units, the set of advertisement spaces comprises:
   detecting, by the number of processor units, objects in the next frame; and
   determining, by the number of processor units, the set of advertisement spaces in the next frame based on positions of objects relative to potential advertising spaces in the next frame.

5. The computer implemented method of claim 1 further comprising:
   determining, by the number of processor units, a bid for the set of advertisement spaces in the next frame.

6. The computer implemented method of claim 5, wherein determining the bid for the set of advertisement spaces comprises:
   predicting, by the number of processor units, a criticality for the set of advertising spaces in the next frame; and
   determining, by the number of processor units, the bid for the set of advertisement spaces based on the criticality determined for the set of advertising spaces in the next frame.

7. The computer implemented method of claim 1, wherein the sequence of frames comprises a current frame and a number of past frames in the live video stream.

8. The computer implemented method of claim 1, wherein predicting the event in the next frame further comprises:
   analyzing a sequence of frames for environmental changes in the live video stream using a trained environmental context recognition model; and
   adjusting the prediction of the event in the next frame based on differences between the live video stream and static video frames of the environment.

9. The computer implemented method of claim 1, wherein predicting the event in the next frame further comprises:
   analyzing, by the number of processor units, a temporal sequence of events in the activity;
   determining, by the number of processor units, a probability distribution of possible events that may occur in the next frame based on the temporal sequence of events;
   calculating, by the number of processor units, a criticality score for each possible event in the probability distribution; and
   prioritizing, by the number of processor units, advertisement space bidding based on the criticality scores of the possible events.

10. A computer system comprising:
    a number of processor units, wherein the number of processor units executes program instructions to:
    receive a sequence of frames for a live video stream for an activity;
    predict utilizing a frame prediction machine learning model trained to predict an event in a next frame for the live video stream from the sequence of frames for the activity static video frames of an environment in which the activity takes place;
    determine whether the next frame matches a current frame received in the live video stream;
    determine a set of advertisement spaces in the next frame predicted for the live video stream based on positions of objects in the next frame relative to potential advertisement spaces;

placing, by the number of processor units, a bid for a set of advertising spaces in the next frame based on a criticality for the next frame determined in response to the next frame matching the current frame received in the live video stream; and updating, by the number of processor units, the set of advertisement spaces in response to changes in predicted events during the live video stream.

11. The computer system of claim 10, wherein the frame prediction machine learning model is trained to predict the next frame from the sequence of frames received in the live video stream and static video frames of an environment in which the activity takes place.

12. The computer system of claim 10, wherein as part of predicting the next frame, the number of processor units further executes program instructions to:

predict an event for the next frame from the sequence of frames; and predict the next frame for the live video stream using the sequence of frames and the event predicted from the sequence of frames.

13. The computer system of claim 10, wherein as part of determining the set of advertisement spaces, the number of processor units further executes program instructions to:

detect objects in the next frame; and determine the set of advertisement spaces in the next frame based on positions of objects relative to potential advertising spaces in the next frame.

14. The computer system of claim 10, wherein the number of processor units further executes program instructions to:

determine a bid for the set of advertisement spaces in the next frame.

15. The computer system of claim 10, wherein the sequence of frames comprises a current frame and a number of past frames in the live video stream.

16. The computer system of claim 10, wherein predicting the event in the next frame further comprises:

analyzing a sequence of frames for environmental changes in the live video stream using a trained environmental context recognition model; and adjusting the prediction of the event in the next frame based on differences between the live video stream and static video frames of the environment.

17. The computer system of claim 10, wherein predicting the event in the next frame further comprises:

analyzing, by the number of processor units, a temporal sequence of events in the activity;

determining, by the number of processor units, a probability distribution of possible events that may occur in the next frame based on the temporal sequence of events;

calculating, by the number of processor units, a criticality score for each possible event in the probability distribution; and prioritizing, by the number of processor units, advertisement space bidding based on the criticality scores of the possible events.

18. A computer program product for predicting an event in a next frame, the computer program product comprising a computer readable storage medium having program instructions embodied therewith, the program instructions executable by a computer system to cause the computer system to:

receive a sequence of frames for a live video stream for an activity;

predict utilizing a frame prediction machine learning model trained to predict the event in the next frame for the live video stream from the sequence of frames for the activity and static video frames of an environment in which the activity takes place;

determine whether the next frame matches a current frame received in the live video stream;

determine a set of advertisement spaces in the next frame predicted for the live video stream based on positions of objects in the next frame relative to potential advertisement spaces;

place a bid for a set of advertising spaces in the next frame based on a criticality for the next frame determined in response to the next frame matching the current frame received in the live video stream; and update the set of advertisement spaces in response to changes in predicted events during the live video stream.

19. The computer program product claim 18, wherein predicting the event in the next frame further comprises:

analyzing a sequence of frames for environmental changes in the live video stream using a trained environmental context recognition model; and adjusting the prediction of the event in the next frame based on differences between the live video stream and static video frames of the environment.

20. The computer program product claim 18, wherein predicting the event in the next frame further comprises:

analyzing a temporal sequence of events in the activity;

determining a probability distribution of possible events that may occur in the next frame based on the temporal sequence of events;

calculating a criticality score for each possible event in the probability distribution; and prioritizing advertisement space bidding based on the criticality scores of the possible events.

* * * * *